United States Patent
Mc Lain et al.

(10) Patent No.: US 7,797,993 B2
(45) Date of Patent: *Sep. 21, 2010

(54) INTAKE AIR TEMPERATURE SENSOR DIAGNOSTIC SYSTEM AND METHOD

(75) Inventors: Kurt D. Mc Lain, Clarkston, MI (US); Wenbo Wang, Novi, MI (US)

(73) Assignee: GM Global Technology Operations, Inc.

( * ) Notice: Subject to any disclaimer, the term of this patent is extended or adjusted under 35 U.S.C. 154(b) by 303 days.

This patent is subject to a terminal disclaimer.

(21) Appl. No.: 12/051,062

(22) Filed: Mar. 19, 2008

(65) Prior Publication Data

US 2009/0235725 A1 Sep. 24, 2009

(51) Int. Cl.
*G01M 15/04* (2006.01)

(52) U.S. Cl. .................................... 73/114.31

(58) Field of Classification Search .............. 73/114.31, 73/114.32, 114.34, 114.77
See application file for complete search history.

(56) References Cited

U.S. PATENT DOCUMENTS

| 5,631,412 | A  * | 5/1997  | Tomisawa ............... 73/114.32 |
| 7,369,937 | B1 * | 5/2008  | Wang et al. ............... 701/114 |
| 2002/0035868 | A1* | 3/2002 | Muto et al. ............. 73/204.27 |
| 2006/0157001 | A1* | 7/2006 | Rahman et al. .......... 123/41.15 |
| 2008/0319600 | A1* | 12/2008 | McLain et al. ............. 701/29 |
| 2009/0138154 | A1* | 5/2009 | Mc Lain et al. ............ 701/34 |
| 2010/0010722 | A1* | 1/2010 | Mc Lain et al. ........... 701/102 |

* cited by examiner

*Primary Examiner*—Eric S McCall

(57) ABSTRACT

An intake air temperature (IAT) sensor diagnostic system may include an IAT determination module, a mass air flow (MAF) module, and a diagnostic module. The IAT determination module determines a measured IAT based on an IAT sensor. The MAF module determines a reference temperature based on a MAF sensor. The diagnostic module determines faults in the IAT sensor based on a comparison between the reference temperature and the measured IAT.

10 Claims, 4 Drawing Sheets

INTAKE AIR TEMPERATURE SENSOR DIAGNOSTIC SYSTEM AND METHOD

FIELD

The present disclosure relates to engine diagnostic systems, and more particularly to intake air temperature sensor diagnostic systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines ignite a fuel and air mixture to produce a drive torque. More specifically, air is drawn into the engine through a throttle and mixed with fuel to form an air and fuel mixture. The air and fuel mixture is compressed within a cylinder by a piston and is then ignited within a cylinder to reciprocally drive the piston within the cylinder. The piston rotationally drives a crankshaft of the engine.

Engine operation is regulated based on several parameters including, but not limited to, intake air temperature (IAT), manifold absolute pressure (MAP), throttle position (TPS), engine RPM and barometric pressure ($P_{BARO}$). Traditional internal combustion engines include an IAT sensor to directly measure the IAT. In some instances, the IAT sensor may become inaccurate as a result of damage, wear and/or a number of other factors. Accordingly, the IAT sensor may be monitored to determine whether the IAT sensor reading is accurate.

Some traditional internal combustion engine systems include a second IAT sensor. The reading from the second IAT sensor is compared with that of the first IAT sensor in order to determine whether the first IAT sensor is accurate. This additional IAT sensor, however, increases cost and complexity and must also be monitored for accuracy.

SUMMARY

Accordingly, an intake air temperature (IAT) sensor diagnostic system may include an IAT determination module, a mass air flow (MAF) module, and a diagnostic module. The IAT determination module determines a measured IAT based on an IAT sensor. The MAF module determines a reference temperature based on a MAF sensor. The diagnostic module diagnoses faults in the IAT sensor based on a comparison between the reference temperature and the measured IAT.

In another aspect, a diagnostic method for an intake air temperature (IAT) sensor may include generating a measured IAT associated with an engine using an IAT sensor, determining a reference temperature using a mass air flow (MAF) sensor, and indicating a fault condition of the IAT sensor when the difference between the reference temperature and the measured IAT reaches a threshold value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
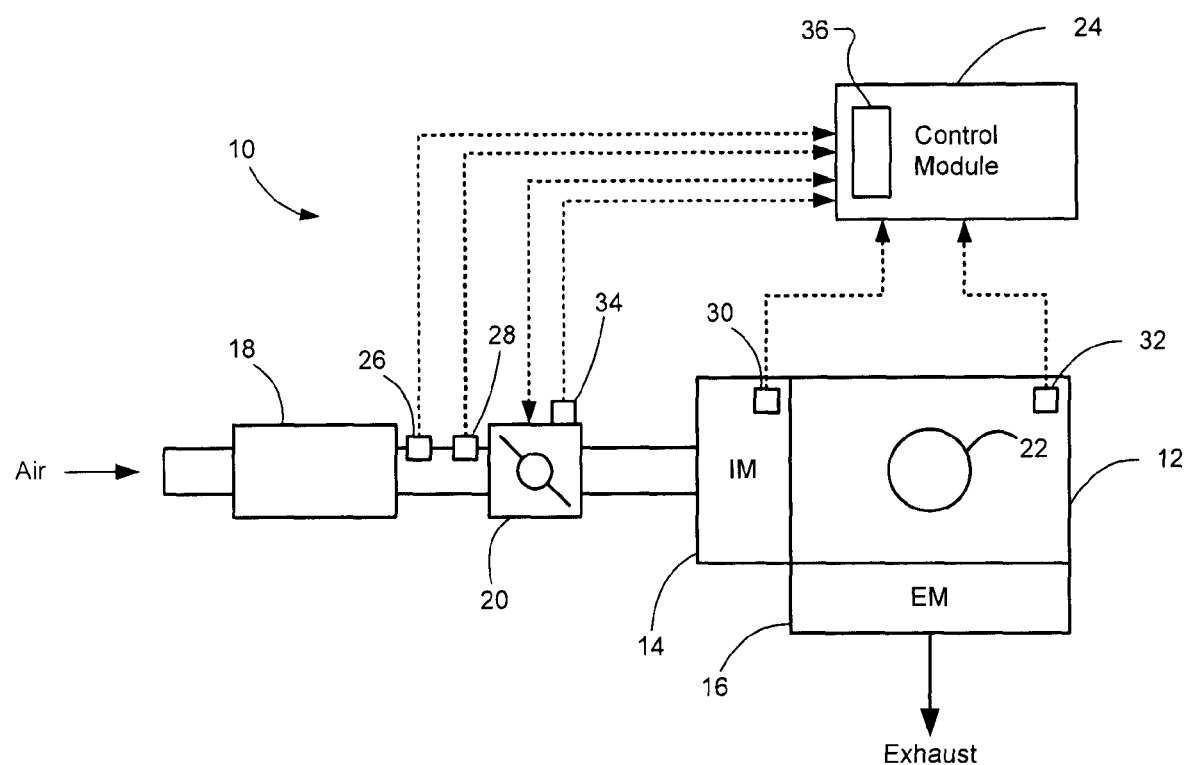
FIG. 1 is a functional block diagram of an internal combustion engine system that is regulated in accordance with an intake air temperature (IAT) sensor diagnostic system of the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The intake air temperature (IAT) sensor diagnostic system of the present disclosure is provided to monitor and determine the rationality of the IAT sensor. A reference temperature is obtained from an existing MAF sensor. The IAT sensor diagnostic system compares a temperature measured by the IAT sensor with the reference temperature. The IAT sensor diagnostic system may determine that the IAT sensor is in a fault condition when the difference between the reference temperature and the measured IAT is or above a threshold value.

Referring now to FIG. 1, an exemplary internal combustion engine system 10 is illustrated. The engine system 10 includes an engine 12, an intake manifold (IM) 14 and an exhaust manifold (EM) 16. Air is drawn into the intake manifold 14 through an air filter 18 and a throttle 20. The air is mixed with fuel to form a fuel and air mixture. The fuel and air mixture is ignited and combusted within a cylinder 22 of the engine 12 by a piston (not shown). The combustion process releases energy that is used to reciprocally drive the piston within the cylinder 22. Exhaust air generated by the combustion process is exhausted through the exhaust manifold 16 and is released to atmosphere after being treated in an exhaust after-treatment system (not shown). Although a single cylinder 22 is illustrated, it is anticipated that the intake air sensor diagnostic system of the present disclosure can be implemented with engines having more than one cylinder.

A control module 24 is provided for controlling engine components including, but not limited to, fuel injection, ignition timing, variable valve timing and peripherals relating to the engine operation. The control module 24 may be in communication with an intake air temperature (IAT) sensor 26, a mass air flow (MAF) sensor 28, a manifold absolute pressure (MAP) sensor 30, an engine RPM sensor 32, and a throttle position sensor 34.

The control module 24 processes signals generated by these sensors 26, 28, 30, 32, 34 and regulates the engine operation based on a plurality of engine operating parameters including, but not limited to, a pre-throttle static pressure, a pre-throttle stagnation pressure (i.e., the total air pressures upstream of the throttle), IAT, MAF, MAP, an effective throttle area, an engine RPM and a barometric pressure. The control module 24 of the present disclosure may include an IAT sensor diagnostic system 36.

Figure 2:
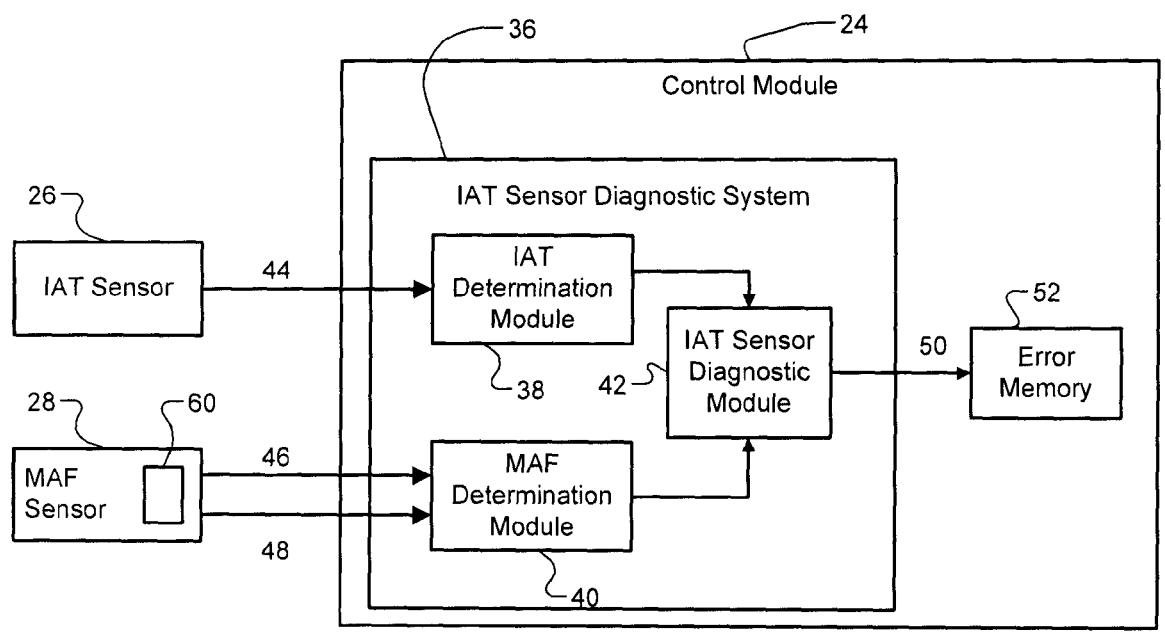
FIG. 2 is a control block diagram of a control module incorporating an IAT sensor diagnostic system of the present disclosure.

Referring to FIG. 2, the control module 24 includes an IAT sensor diagnostic system 36. The IAT sensor diagnostic system 36 may include an IAT determination module 38, an MAF determination module 40, and an IAT sensor diagnostic module 42 in communication with the IAT determination module 38 and the MAF determination module 40. The IAT determination module 38 determines a measured IAT based on a first signal 44 from the IAT sensor 26. The MAF determination module 40 determines a mass flow rate of the intake air based on a second signal 46 from the MAF sensor 28. The MAF determination module 40 also determines a temperature of a reference thermistor $R_1$ (shown in FIG. 3) of the MAF sensor 28 based on a third signal 48. The IAT sensor diagnostic module 42 monitors the rationality of the IAT sensor 26 based on signals from the IAT determination module 38 and the MAF determination module 40, which will be described in more detail below. When the IAT diagnostic module 42 determines a fault condition of the IAT sensor 26, a fault signal 50 is generated and sent to an error memory 52 for later analysis and/or reported to a vehicle driver.

Figure 3:
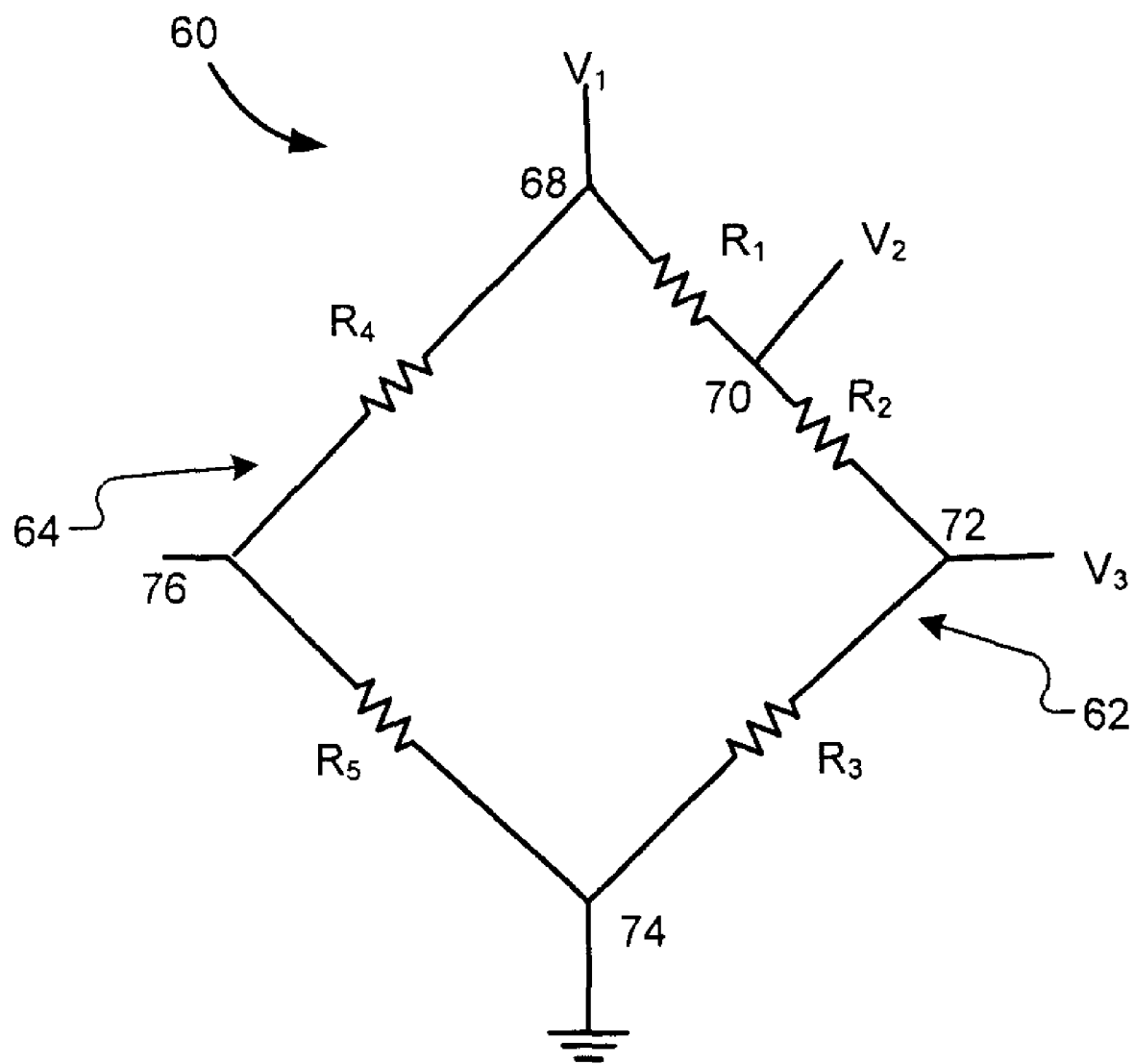
FIG. 3 is an exemplary circuit diagram for a mass air flow sensor.

Referring to FIG. 3, the MAF sensor 28 may include a Wheatstone bridge circuit 60 including a reference thermistor $R_1$, a second resistor $R_2$, a third resistor $R_3$, a measuring thermistor $R_4$, and a fifth resistor $R_5$. The reference thermistor $R_1$, the second resistor $R_2$ and the third resistors $R_3$ are connected in series at a first leg 62 of the bridge circuit 60. The measuring thermistor $R_4$ and the fifth resistor $R_5$ are connected in series at a second leg 64 of the bridge circuit 60. The first leg 62 and the second leg 64 are connected in parallel.

The reference thermistor $R_1$ and the measuring thermistor $R_4$ may have variable resistance and may have a positive temperature coefficient or a negative temperature coefficient depending on specific applications. The second, third and fifth resistors $R_2$, $R_3$ and $R_5$ are fixed resistors and have constant resistance. The measuring resistor $R_4$ functions as a heated sensing element for measuring the mass air flow rate. The reference thermistor $R_1$ is designed for air flow measurement compensation given different intake air temperatures, and borrowed here for IAT sensor rationality diagnostic purposes.

The bridge circuit 60 has terminals 68, 70, 72, 74 and 76. An input voltage $V_1$ is applied to the bridge circuit 60 at the terminal 68. The terminal 74 is grounded. Before the intake air flow is measured, the voltage $V_3$ across terminals 72 and 76 may be set to zero to balance the bridge circuit 60. When subjected to an air flow, the bridge circuit 60 becomes unbalanced due to a resistance change in the measuring thermistor $R_4$. This is because the air flow causes a temperature drop in the measuring thermistor $R_4$ as a result of heat loss from the measuring thermistor $R_4$ to the intake air. The bridge circuit 60 can be rebalanced by changing the input voltage $V_1$ to maintain zero voltage output across terminals 72 and 76. When the intake air temperature changes, the bridge circuit 60 becomes unbalanced also due to a resistance change in the compensation thermistor $R_1$. The bridge circuit 60 can be rebalanced again by changing the input voltage $V_1$ to maintain zero voltage output across terminals 72 and 76. A second signal 46 corresponding to the input voltage $V_1$ may be sent to the MAF determination module 40 for determining the mass air flow rate.

As the mass air flow is measured, a reference voltage $V_2$ is continuously measured at the terminal 70. A third signal 48 corresponding to the reference voltage $V_2$ may also be sent to the MAF determination module 40.

It should be understood and appreciated that the bridge circuit 60 may include a different number of resistors/thermistors and may have different arrangement and configuration depending on specific applications without departing from the spirit of the present disclosure.

Figure 4:
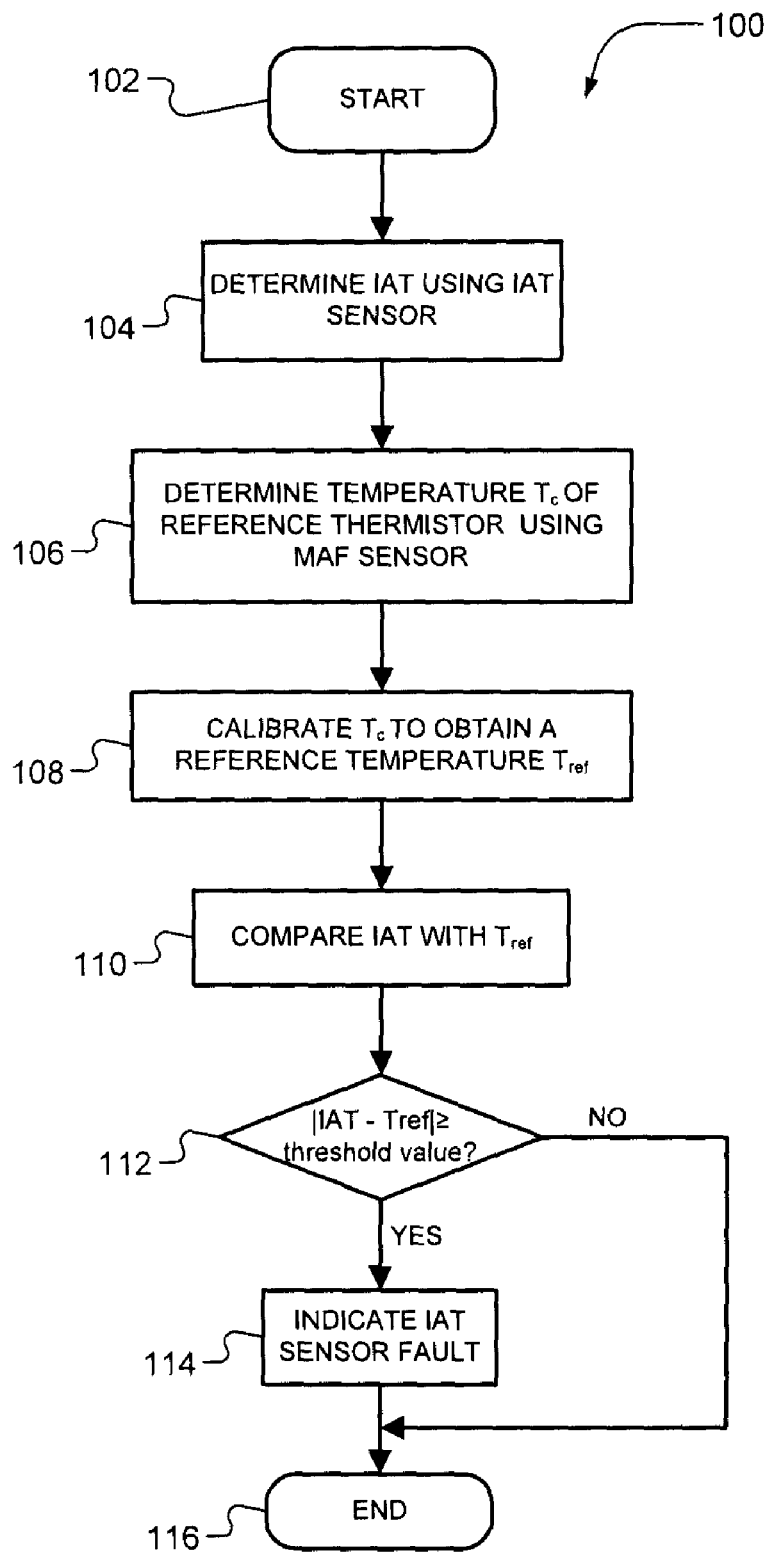
FIG. 4 is a flowchart illustrating exemplary steps that are executed by the IAT sensor diagnostic system of the present disclosure.

Referring to FIG. 4, the IAT sensor diagnostic method 100 begins in step 102. In step 104, when the intake air passes over the IAT sensor 26 and the MAF sensor 28, the IAT sensor 26 generates a first signal 44 corresponding to the intake air temperature to the IAT determination module 38 for processing. Based on the first signal 44, the IAT determination module 38 determines an IAT measured by the IAT sensor 26. This measured IAT may be sent to the IAT diagnostic module 42 for rationality diagnosis. At the same time, the MAF sensor 28 may send a second signal 46 corresponding to the input voltage $V_1$ and a third signal 48 corresponding to the reference voltage $V_2$ to the MAF determination module 40 in step 106. In addition to determining the mass air flow rate of the intake air, the MAF determination module 40 also processes the second signal 46 and the third signal 48 to obtain a reference temperature $T_{ref}$. This reference temperature $T_{ref}$ may be sent to the IAT diagnostic module 42 for diagnostic purposes.

More specifically, the resistance of the reference thermistor $R_1$, the resistance of the resistors $R_2$ and $R_3$, the input voltage $V_1$, and the reference voltage $V_2$ have the following relationship:

$$V_2 = \frac{R_2 + R_3}{R_1 + R_2 + R_3} V_1 \qquad \text{(Equation 1)}$$

$$R_1 = \left[\frac{V_1}{V_2} - 1\right](R_2 + R_3) \qquad \text{(Equation 2)}$$

wherein $R_1$ is the variable resistance of the reference thermistor;

$R_2$ is the resistance of the second resistor;

$R_3$ is the resistance of the third resistor;

$V_1$ is the input voltage applied to the bridge circuit; and $V_2$ is the reference voltage.

Because resistors $R_2$ and $R_3$ are fixed resistors, the resistances of the resistors $R_2$ and $R_3$ remain unchanged and are known. The variable resistance of the reference thermistor $R_1$ at the measured temperature can be derived from equation 2.

The reference thermistor $R_1$ may be selected to have a linear response to a change in temperature, i.e., a constant temperature coefficient of resistance. Therefore, in step 106, the temperature $T_c$ of the reference thermistor $R_1$ at the measured temperature may be calculated based on the following equation:

$$T_c = T_0 + \frac{R_1(T_c) - R_1(T_0)}{\alpha} \qquad \text{(Equation 3)}$$

wherein $R_1(T_c)$ is the calculated resistance derived from Equation 2; $\alpha$ is the temperature coefficient of resistance of the reference thermistor $R_1$; and $R_1(T_0)$ is the resistance of the reference thermistor $R_1$ at a starting temperature or room temperature $T_0$ and is known.

Since the calculated temperature $T_c$ of the reference thermistor $R_1$ may not accurately reflect the actual IAT, the calculated temperature $T_c$ is calibrated to result in a reference temperature $T_{ref}$ in step 108. The calculated temperature $T_c$ may be calibrated via a variety of known methods depending on the configuration and location of the MAF sensor 28. The reference temperature $T_{ref}$ is sent to the IAT sensor diagnostic module 42.

The IAT sensor diagnostic module 42 receives signals indicative of the measured IAT and the reference temperature $T_{ref}$ from the IAT determination module 38 and the MAF determination module 40, respectively. In step 110, the IAT sensor diagnostic module 42 compares the IAT measured by the IAT sensor 26 with the reference temperature $T_{ref}$ to determine whether the measured IAT reading is rational. In step 112, when the reference temperature $T_{ref}$ is significantly higher or lower than the IAT, i.e., the difference between the measured IAT and the reference temperature is or above a threshold value, the IAT diagnostic module 42 may determine a fault condition of the IAT sensor 26 and may generate a fault signal 50 in step 114. The fault signal 50 may be sent to an error memory 52 for later analysis and/or reported to a vehicle driver, thereby completing the diagnostic process in step 116. If the difference between the reference temperature $T_{ref}$ and the measured IAT is below the threshold value, the diagnostic process ends in step 116.

While not shown in the figures, it should be understood and appreciated that the first signal 44, the second signal 46, and the third signal 48 may be sent directly to the IAT sensor diagnostic module 42. The IAT sensor diagnostic module 42 may perform an algorithm similar to that previously described without the IAT determination module 38 and the MAF determination module 40.

With the configuration of the present disclosure, the IAT diagnostic can be achieved by using an existing MAF sensor without any additional sensor. Therefore, the IAT sensor diagnostic system 36 of the present disclosure can reduce the costs of the engine control unit, while providing a reliable IAT sensor diagnostic.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. An intake air temperature sensor diagnostic system comprising:
    an intake air temperature (IAT) determination module that determines an IAT measured by an IAT sensor;
    a mass air flow (MAF) determination module that determines a reference temperature measured by a MAF sensor; and
    a diagnostic module that diagnoses faults in the IAT sensor based on a comparison between the reference temperature and the IAT measured by the IAT sensor.

2. The diagnostic system of claim 1, wherein the MAF sensor includes a first thermistor for providing the reference temperature.

3. The diagnostic system of claim 2, wherein the reference temperature is determined based on a voltage across the first thermistor.

4. The diagnostic system of claim 2, wherein the reference temperature is correlated to a temperature of the first thermistor.

5. The diagnostic system of claim 1, wherein the MAF sensor includes a second thermistor for measuring a mass air flow of the intake air.

6. A diagnostic method for an intake air temperature (IAT) sensor comprising:
    determining an IAT associated with an engine measured by an IAT sensor;
    determining a reference temperature measured by a mass air flow (MAF) sensor; and
    indicating a fault condition of the IAT sensor when a difference between the reference temperature and the IAT reaches a threshold value.

7. The diagnostic method of claim 6 further comprising calculating a temperature of a first thermistor of the MAF sensor to achieve a calculated temperature.

8. The diagnostic method of claim 7 further comprising calibrating the calculated temperature to achieve the reference temperature.

9. The diagnostic method of claim 7, further comprising measuring a voltage across the first thermistor of the MAF sensor, the calculated temperature correlated to the voltage.

10. The diagnostic method of claim 7, wherein the MAF includes a second thermistor for measuring a mass air flow rate.

* * * * *